Figure 1:
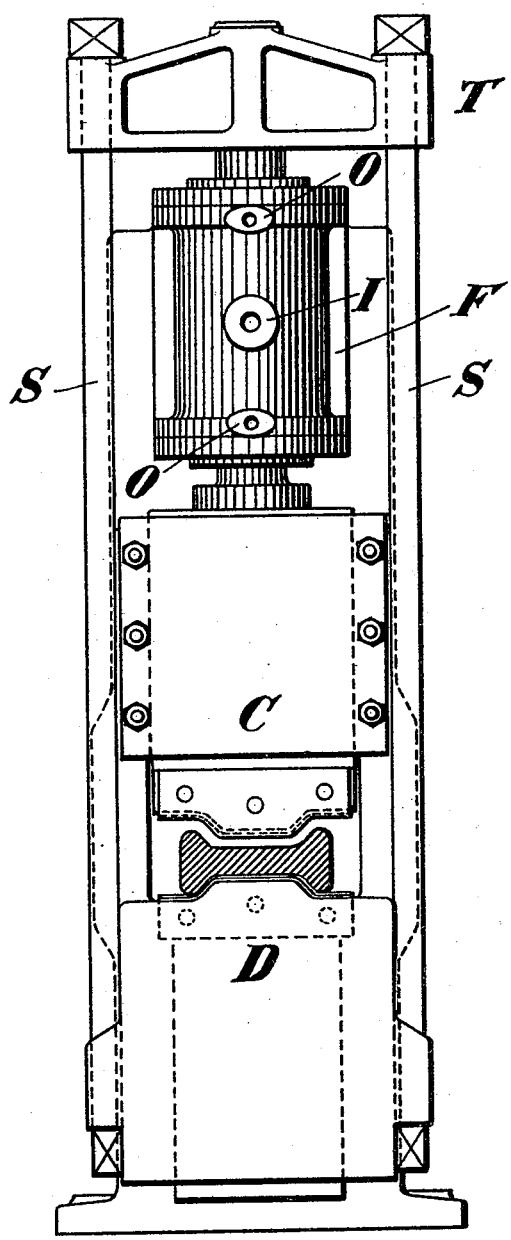

No. 642,631. Patented Feb. 6, 1900.
M. ROTHE.
METAL SHEARING MACHINE.
(Application filed July 17, 1899.)
(No Model.) 2 Sheets—Sheet 1.

Witnesses:
Anton A. Glaitner
N. Mitchell

Inventor:
Moritz Rothe
by Max Pingel
Attorney.

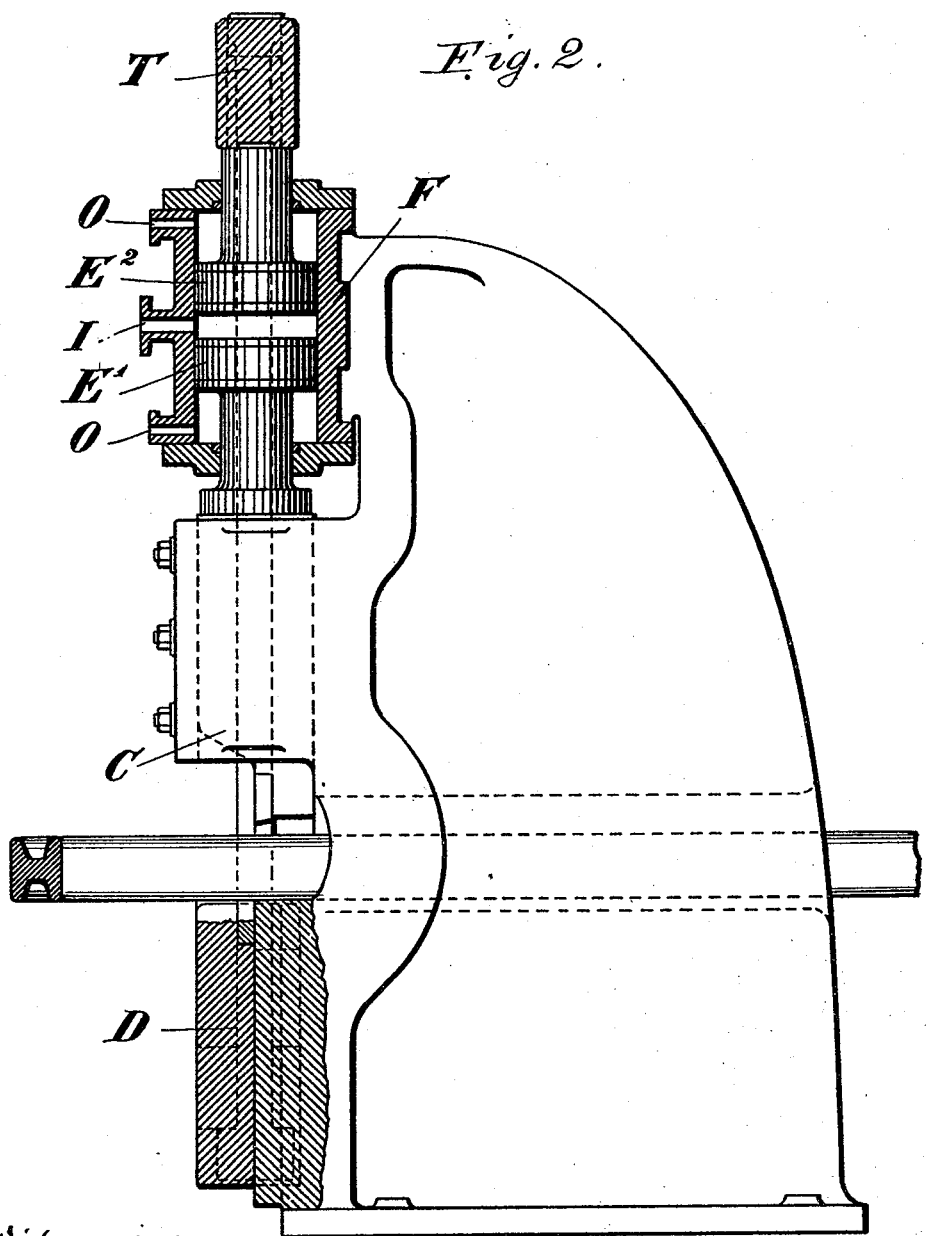

UNITED STATES PATENT OFFICE.

MORITZ ROTHE, OF COLOGNE, GERMANY, ASSIGNOR TO THE KALKER WERKZEUGMASCHINEN-FABRIK L. W. BREUER, SCHUMACHER & CO., OF KALK, GERMANY.

METAL-SHEARING MACHINE.

SPECIFICATION forming part of Letters Patent No. 642,631, dated February 6, 1900.

Application filed July 17, 1899. Serial No. 724,175. (No model.)

*To all whom it may concern:*

Be it known that I, MORITZ ROTHE, a subject of the King of Prussia, German Emperor, and a resident of Kalkerstreet 28, Cologne-Deutz, Germany, have invented certain improvements in shearing apparatus for shearing metal bars and the like, in combination with an arrangement for clamping the material, of which the following is a specification.

This invention relates to machines for cutting or shearing metal bars and the like; and it consists, substantially, in such features of improvement as will hereinafter be more particularly described.

In machines for cutting and shearing metal bars and the like it is very important in order to effect a straight cut that the bar be prevented from canting over while being cut. Hitherto in some instances it has been usual to employ specially-devised clamping devices for this purpose. According to the present invention I dispense with the use of special clamps and effect the clamping or holding of the bar by means of the same pressure employed to effect the shearing or cutting.

In the practice of my invention the movement of the cutting or shearing blades is effected one after the other, the first blade operating to clamp the material to be cut and the second blade operating to effect the cutting. Preferably the motion of the cutting or shearing blades is effected by means of a single apparatus in which steam, water, or compressed air is employed as the pressure fluid.

In the accompanying drawings, Figure 1 represents in front elevation, partly in section, a cutting or shearing machine embodying my improvement in connection therewith. Fig. 2 is a side elevation in part section.

The accompanying drawings show by way of example the general construction and arrangement of the machine.

C and D are the two blade-carriers, the former effecting the clamping of the material and the latter the cut. In the frame of the machine above the blade-carriers there is a cylinder F, with a divided or double piston, the lower part $E'$ of which being fixed directly to the upper blade-carrier C, while the upper part $E^2$ is connected with the lower blade-carrier D by means of a cross-head T and rods S. By the entrance of the pressure fluid into the cylinder F at I first the piston $E'$ is pressed down by its own weight, so that the upper blade clamps the material. Then the upper piston $E^2$ rises, causing the lower blade to shear the bar, the fluid being forced out of the cylinder through the openings O. By reversing the fluid the two parts of pistons $E'$ and $E^2$ and the blade-carriers connected with them are moved back to their first positions.

Having now particularly described the nature of this invention and in what manner the same is carried into effect, what I claim is—

1. A shearing-machine having two movable shearing-blade carriers, combined with a pressure device operating first to move one blade for clamping the material, and then the other blade for effecting the cut.

2. A shearing-machine having two movable shearing-blades in combination with a fluid-pressure device operating first to move one blade for clamping the material and then the other blade to effect the cut.

3. A shearing-machine combined with a pressing device in form of a divided piston the parts of which being connected each to a blade-carrier so that the pressure fluid entering between the two piston parts moves the two blades for clamping and cutting the material.

4. A shearing-machine comprising vertically-reciprocating shearing-blade carriers, combined with a fluid-pressure cylinder provided with inlet and outlet openings for a fluid, a two-part piston working in said cylinder, connecting means between the lower part of said piston and the upper carrier, and a cross-head and connecting-rods between the lower part of the piston and the lower carrier, substantially as shown and described.

In witness whereof I have hereunto set my hand in presence of two witnesses.

MORITZ ROTHE.

Witnesses:
 WILLIAM H. MADDEN,
 LOUISE BARNES.